April 28, 1970 G. FEILER 3,508,827
METHOD AND APPARATUS FOR PRINTING BLACK
AND WHITE OR COLOUR FILMS
Filed March 30, 1967 2 Sheets-Sheet 1

Inventor:
GÜNTER FEILER
ATTORNEY

April 28, 1970     G. FEILER     3,508,827
METHOD AND APPARATUS FOR PRINTING BLACK
AND WHITE OR COLOUR FILMS
Filed March 30, 1967     2 Sheets-Sheet 2
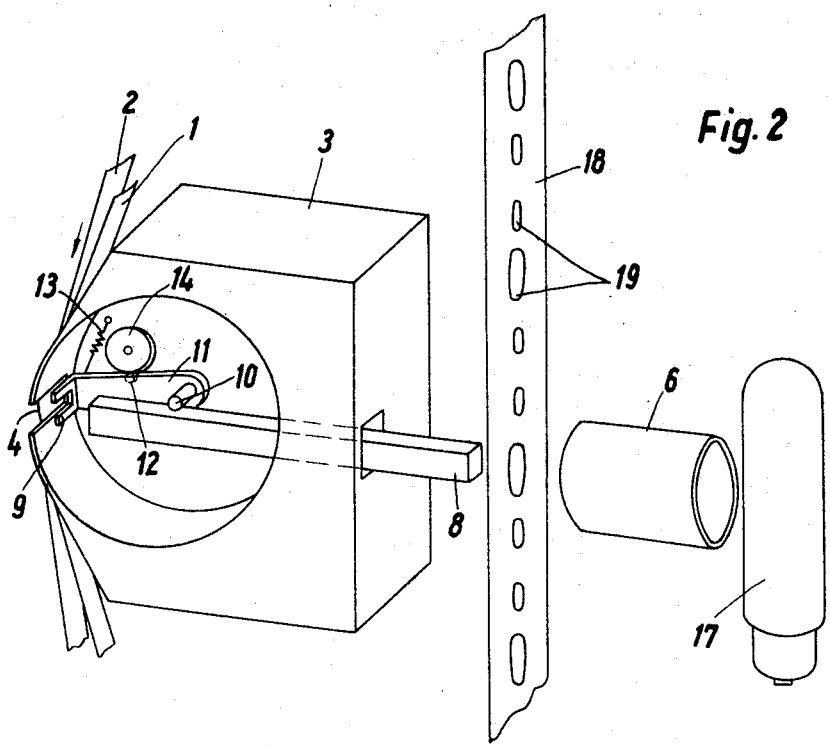
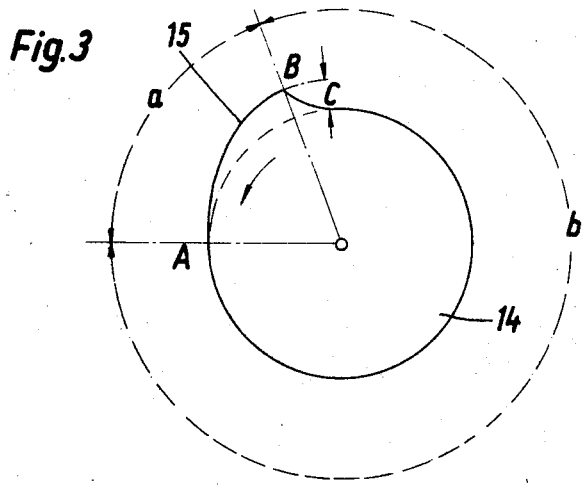
Inventor:
GÜNTER FEILER
ATTORNEY

United States Patent Office 3,508,827
Patented Apr. 28, 1970

3,508,827
METHOD AND APPARATUS FOR PRINTING BLACK AND WHITE OR COLOUR FILMS
Günter Feiler, Berlin, Germany, assignor to Geyer Maschinen- und Apparatebau G.m.b.H., Berlin, Germany, a company of Germany
Filed Mar. 30, 1967, Ser. No. 627,202
Claims priority, application Germany, Apr. 25, 1966, G 46,677
Int. Cl. G03b 27/04
U.S. Cl. 355—124    10 Claims

ABSTRACT OF THE DISCLOSURE

A method and apparatus for printing monochrome or colour films using a printing slot over which the negative and the unexposed positive film are moved in contact at a constant speed along with a light beam which is interrupted at intervals. The light beam has a dimension in the direction of film travel equal the height of a frame, and it illuminates successive frames by being guided across the printing slot in the direction of film travel while a frame is being exposed, and the light beam returns to its starting position and in the opposite direction during a dark period.

---

The invention relates to a method and apparatus for printing black and white or colour films.

Two different methods are known for printing films. In one method, the so-called continuous method, the film to be printed (negative) and the blank film (positive) are guided in contact with each other over a printing slot and past a constant light source. The advantage of this method lies in its high operating speed resulting from the constant speed of the film. The disadvantage of this method lies in the difficulty with which successive film scenes, which are uneven in their light and colour values, can be correctly printed with reference to these values. This correction takes place by interpolation of control means in the light path, for example an apertured belt provided with appropriate colour filters for subtractive coloured light control, or by the so-called additive control in which the colour filters of complementary colours are arranged side-by-side, their individual light beams being brought together to form a combined beam whose colour value is determined by the densities of the individual colour filters. The advance of the belt or the changing of the individual colour filters in the additive control have to take place while the moving film is continuously illuminated, and this leads to impairment of the light and colour values of the last frames of one scene and the first frames of the next scene, depending on the running speed.

A second known method is the so-called step-by-step printing method in which the film is moved step-by-step, for example by using a Maltese cross. In this method a periodically interrupted light source is used, the step-by-step advance of the film taking place during the dark period and the printing of individual, successive, film frames during the light period of the light beam. The advantage of this method is that the control means required on scene changing can be operated during the dark period of the light beam so that no impairment of the light and colour values of the individual film picture can occur on changing scenes. The disadvantage of this known method lies in the low operating speed which is caused by the step-by-step advance of the film; moreover in this film there is the danger of damage because of the jerky transport.

The present invention has for its object the avoidance of the disadvantages of the two known methods and to combine their advantages. This is achieved by the method of the present invention wherein the film to be printed and the blank film are moved over a printing slot in contact with each other and at a constant speed; the light beam for the printing is interrupted at intervals depending on the speed of travel of the film for illuminating the individual successive film frames; the light beam is limited to a height corresponding to the height of the individual film frames; and the light beam during its light periods is guided in the printing slot in the direction of travel of the film at a speed corresponding to the speed of travel of the film and is returned in a direction opposite to the direction of travel of the film during the dark periods. The method according to the invention has the advantage of a high operating speed as a result of the constant film speed. It also has the advantage of simple and faultless control of the light and colour values since the necessary control movements can take place during the dark periods as in the step-by-step printing method. The printing of the individual film frames takes place by guiding a light beam, corresponding to the height of the film frame, in the same direction and at the same speed as the film to be printed and the blank film, so that a faultless illumination of the individual film frames is ensured.

At the start of the light period the light beam is allowed to fall on the tilting shutter; since the height of the tilting shutter corresponds to the height of the individual film frame the illumination of a single film frame takes place. Since the tilting shutter moves at the same speed as the film to be printed during the light period, the film frame is constantly illuminated through the moving tilting shutter during the light period, so that, in spite of the continuously moving film, a stationary illumination of the individual film frame can be said to be carried out as in the step-by-step printing method. The light beam is interrupted during the dark period; in this period the tilting shutter is returned to its starting position in which it remains until the new light period begins when the next individual frame of the film is illuminated in the same way. In this way it is possible to achieve a frame-by-frame illumination of successive individual frames even when the film to be printed is moving continuously.

The apparatus for carrying out the method is characterised in that, in a continuous printing machine operating by the contact method, there is provided a constant light source with a shutter rotating synchronously with the film speed or a flashing lamp actuated at intervals depending on the speed of travel of the film, that between the light guiding rod and the printing slot is arranged a tilting shutter, corresponding to the height of the individual frames of the film to be printed, which, during the light period, moves out of its starting position at the speed of the film in the direction of travel of the film, and returns to its starting position during the dark period, and that the printing slot is of a height at least corresponding to the swing path of the tilting shutter.

One embodiment of the apparatus according to the invention is characterised in that the light guiding rod is arranged to be fixed and corresponds in height at least to the height of the printing slot, and that the shutter is fixed at the end of a pivoting lever, arranged outside the light guiding rod, which is actuated against the action of a tension spring by any desired pivoting member driven synchronously with the film transporting apparatus.

Another embodiment of the apparatus according to the invention is characterised in that the light guiding rod is arranged to be pivotable in the direction of movement of the film and has a shutter corresponding to the height of the individual film frame on its end face towards the printing slot, and that the swinging member directly engages the light guiding rod.

Another feature of the invention is that the swinging member consists of a cam plate, rotating synchronously with the film speed, which rests on the upper side of the pivoting lever or of the light guiding rod which is acted on by a tension spring and has on a part of its circumference corresponding to the duration of the light period, a steadily rising cam whose height corresponds to the swing path covered by the tilting shutter during the light period.

It is important that the pivoting lever or the light guiding rod has a roller held in engagement with the cam by the tension spring.

Finally, the invention is also characterized in that between the light source and the light guiding rod, an apertured belt movable during the dark period of the light beam, or another subtractive or additive control device is provided for controlling the light intensity required on changing scenes in black-and-white films and the colour value in colour films.

The accompanying drawings shown constructional examples of the apparatus according to the invention.

FIGURE 2 shows a modified apparatus with a flash lamp switching on and off at intervals and, FIGURE 3 shows a diagram of the cam plate.

Figure 1:
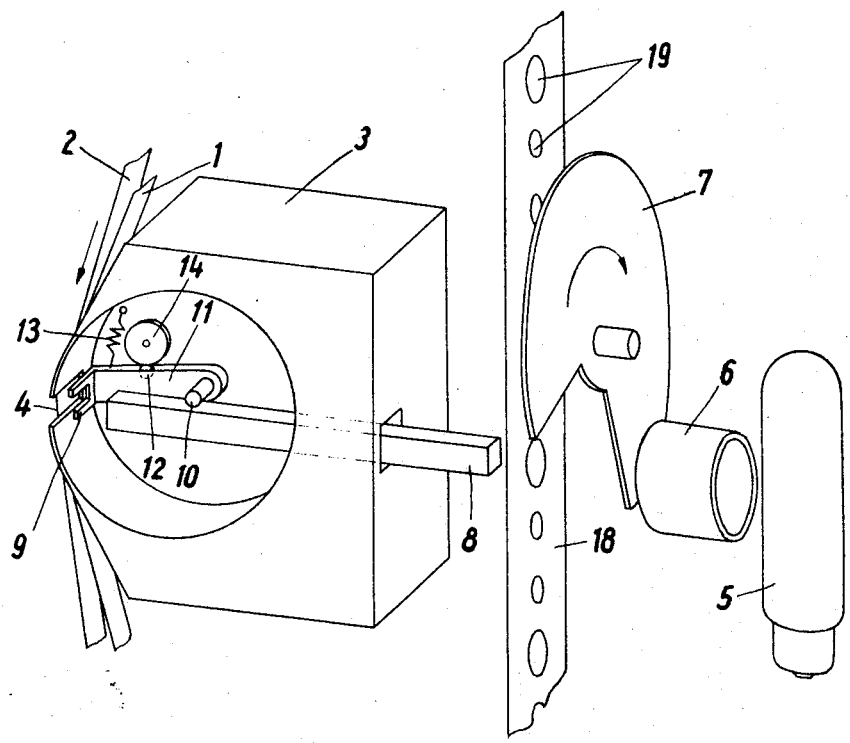
FIGURE 1 shows an apparatus fitted with a constant light source whose light beam is interrupted at intervals by a rotating shutter.

In the embodiment shown in FIGURE 1 the film 1 to be printed and the blank film 2 are moved in contact with each other in a printing apparatus 3 at a constant speed in the direction of the arrow. The printing apparatus 3 has a printing slot 4. The apparatus is provided with a constant light source 5 which projects its light through a condensing lens 6 and a rotating shutter 7 onto a light guiding rod 8 whose height is at least that of the printing slot 4. The light guiding rod 8 is arranged rigidly and projects the light into the printing slot 4. A tilting shutter 9 is provided between the printing slot 4 and the front face of the light guiding rod 8. The height of the opening of the shutter 9 is the same as the height of the individual frames on the film 1 to be printed. The shutter 9 is attached to the end of a lever 11, pivotable about an axis 10 which has, protruding from its upper surface, a roller 12 which is held in contact with a cam plate 14 by the tension spring 13. The cam plate 14 is driven synchronously with the driving apparatus for the film transport. The cam plate 14, as shown in FIGURE 3, has a steadily rising curved path 15 on a part of its circumference between the point A and B. The length of the curved path or its part of the periphery $a$ corresponds to the length of the light period of the light beam, while the rest of the periphery $b$ corresponds to the dark period of the light beam. When the point A arrives at the roller 12 of the pivoting lever 11, the light period begins and the light beam is uninterrupted so that illumination of the film frame in the aperture opening of the tilting shutter 9 takes place. Since the cam plate 14 rotates in the direction of the arrow at the transporting speed of the film, the pivoting lever is moved downwards at the speed of the film by the steadily rising curved path 15, so that during the light period a single frame of the film to be printed is continuously illuminated. When the point B reaches the roller 12 the light period is finished and the light beam is interrupted. Since the pivoting lever 11 with the roller 12 is held in contact with the cam plate 14 by the spring 13, the pivoting lever is pivoted upwardly and remains on the circularly curved path $b$ of the cam circumference until the point A arrives again at the roller 12. At this moment begins the next light period in which the next single frame of the film is illuminated in the same way. The height $c$ of the curved path 15, i.e. the radial distance between the points A and B corresponds to the swing path covered during the light period by the tilting shutter 9. Instead of the shutter 9 and the pivoting lever 11, the light guiding rod 8 itself may be arranged to be pivotable about a point of rotation; a shutter corresponding to the shutter 9 is fixed on the front face of the light guiding rod 8, while the cam plate 14 is held in engagement with a corresponding roller 12 on the light guiding rod by a tension spring 13 which likewise engages the light guiding rod 8. This modified embodiment is not illustrated in the drawings.

FIGURE 2 shows an embodiment in which is provided a lamp 17, switched on and off at intervals, a so-called flash lamp which directs the periodically interrupted light beam through the condenser lens 6, through the light guiding rod 8 and the shutter 9, and into the slot 4 in the same way as before. The function of this embodiment is the same as in FIGURE 1. Naturally, in place of the pivoting lever 11 with the shutter 9, the light guiding rod 8 can be adapted to pivot in the same way as in FIGURE 1.

In the embodiments shown in FIGURES 1 and 2 a known apertured belt 18, provided with holes 19 of different diameters, is arranged between the condenser lens 16 and the light guiding rod 8. When a scene change occurs, i.e. during the dark period between the last picture of one scene and the first picture of the next scene, this apertured belt is moved downwards to bring the next hole 19 in the path of the light beam coming from the lamp 5 or 17. This apertured belt 18, which is only actuated when a scene is changed, in black and white films alters the light intensity of the film scenes with uneven light values on the film to be printed, and it does so in such a way as to provide a uniform light intensity in all the successive scenes on the blank film. For colour films these holes are provided with one or more light filters corresponding to the required correction of the colour values in order to obtain the desired colour values for all the scenes on the blank film.

Naturally, instead of this subtractive colour value control, an additive colour value control can also be used in which the individual light beams of the complementary colours are united to a combined light beam for printing. The individual light beams of the complementary colours are produced by appropriate colour filters, the contributions of the individual light beams being able to be brought into the path of the single light beams at varying intensities. Here too the exchange of these colour filters of the complementary colours cn take place during the dark period so that the successive scenes have the desired colour values from the first picture to the last.

What is claimed is:

1. In a method of printing strips of black and white and colour picture films from a negative film to a positive film, wherein said films have frames of a given height, and by the use of a light beam, the steps comprising, moving said films at a constant speed in contact with each other and over a printing slot, providing said light beam in a height corresponding to the film frame height and with said light beam being guided onto said films and through said printing slot and therealong in the direction of travel of said films and at a speed corresponding to the speed of said films, and interrupting said light beam at intervals depending on the speed of said films.

2. The method of claim 1, wherein, during the step of interrupting said light beam, there are the steps of guiding said light beam into the direction opposite from the direction of travel of said films and returning said light beam to its original position.

3. The subject matter of claim 1, including the step of interrupting said light beam after each time each of said frames is exposed to said light beam.

4. Apparatus for printing black and white and colour picture films respectively having picture frames which are moved at a constant speed and in overlying relationship of a positive film and a negative film, comprising a light source, a slotted shutter movable between said light source and said films and at said speed of said films, and shutter having a slot of the height of said film frames for the passage of light from said source to said films and therewith at said speed of said films, and means operatively associated with said shutter for moving the latter at said speed.

5. The subject matter of claim 4, wherein said means is operatively associated with said shutter for moving said shutter in the direction opposite to that of said films to return said shutter to its position of starting movement.

6. The subject matter of claim 5, including light control means for interrupting said light source in its passage to said films and during the time when said shutter is returning to its position of starting movement.

7. The subject matter of claim 4, including a light guiding rod of at least the height of said slot for guiding the light from said light source to said slot.

8. The subject matter of claim 7, wherein said shutter is pivotal and said slot is arranged to move parallel to the plane of movement of said films.

9. The subject matter of claim 8, including a cam operative on said shutter and rotatable at a speed synchronized with the speed of the films for pivoting said shutter at said speed.

10. The subject matter of claim 4, including a light intensity controlling member movable between said light source and said films and having different portions for the passage of light of different and selectable intensities.

References Cited
UNITED STATES PATENTS

| | | | |
|---|---|---|---|
| 2,742,837 | 4/1956 | Streiffert | 355—108 |
| 3,270,651 | 9/1966 | Wetzel et al. | 355—132 |

NORTON ANSHER, Primary Examiner

R. A. WINTERCORN, Assistant Examiner

U.S. Cl. X.R.

355—88, 104, 108, 132